(12) United States Patent
Wu et al.

(10) Patent No.: US 10,624,493 B2
(45) Date of Patent: Apr. 21, 2020

(54) GRILL DEVICE

(71) Applicant: Tsann Kuen (Zhangzhou) Enterprise Co., Ltd., Zhangzhou (CN)

(72) Inventors: Linzhe Wu, Zhangzhou (CN); Chunyu Wu, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 363 days.

(21) Appl. No.: 15/680,531

(22) Filed: Aug. 18, 2017

(65) Prior Publication Data
US 2017/0340166 A1  Nov. 30, 2017

Related U.S. Application Data

(63) Continuation-in-part of application No. 15/239,946, filed on Aug. 18, 2016, now Pat. No. 10,413,120, and a continuation-in-part of application No. 15/239,936, filed on Aug. 18, 2016, now Pat. No. 10,285,537.

(30) Foreign Application Priority Data

Aug. 21, 2015  (CN) .......................... 2015 1 0516436
Aug. 21, 2015  (CN) .......................... 2015 1 0516496
Apr. 14, 2017  (CN) .......................... 2017 1 0242734

(51) Int. Cl.
*A21B 5/02* (2006.01)
*A47J 37/06* (2006.01)

(52) U.S. Cl.
CPC ................................ *A47J 37/0611* (2013.01)

(58) Field of Classification Search
CPC ......... A47J 37/00; A47J 37/015; A47J 37/06; A47J 37/0611; A47J 37/067; A47J 37/0676; A47J 37/0885; A47J 2037/0617

USPC .................. 99/326–334, 339, 350, 372–381
See application file for complete search history.

(56) References Cited

U.S. PATENT DOCUMENTS

| | | | | |
|---|---|---|---|---|
| 5,299,492 A | * | 4/1994 | Carbon | A21B 5/023 99/373 |
| 2007/0283821 A1 | * | 12/2007 | May | A47J 37/0611 99/372 |
| 2017/0049267 A1 | | 2/2017 | Zhan et al. | |

FOREIGN PATENT DOCUMENTS

| GB | 441336 A | 1/1936 |
|---|---|---|
| WO | 2016119691 A1 | 8/2016 |

OTHER PUBLICATIONS

The Search Report issued to European counterpart application No. 18150918.3 by the EPO dated Apr. 19, 2018.

* cited by examiner

*Primary Examiner* — Hung D Nguyen
(74) *Attorney, Agent, or Firm* — Burris Law, PLLC

(57) ABSTRACT

A grill device includes upper and lower grill units. The upper grill unit has a feed opening. The lower grill unit includes a lower grill plate having a plate body and a flow-diverging stage. The plate body has a central portion that is adapted to be positioned under and aligned with the feed opening, and a surrounding portion that surrounds the central portion. The flow-diverging stage protrudes upwardly from the central portion of the plate body, and has a flow-diverging convex surface that faces the feed opening and that is for diverging flow of a fluid material which flows from the feed opening onto the plate body. The flow-diverging convex surface has a top end positioned higher than the plate body.

14 Claims, 8 Drawing Sheets

GRILL DEVICE

CROSS-REFERENCE TO RELATED APPLICATION

This application is a continuation-in-part (CIP) of co-pending U.S. patent application Ser. No. 15/239,936 filed on Aug. 18, 2016, which claims priority of Chinese Invention Patent Application No. 201510516496.2 filed on Aug. 21, 2015, and is also a CIP of co-pending U.S. patent application Ser. No. 15/239,946 filed on Aug. 18, 2016, which claims priority of Chinese Invention Patent Application No. 201510516436.0 filed on Aug. 21, 2015. This application also claims priority of Chinese Invention Patent Application No. 201710242734.4, filed on Apr. 14, 2017.

FIELD

The disclosure relates to a grill device, and more particularly to a grill device for cooking food.

BACKGROUND

Among various types of grill devices, waffle iron is a device particularly used for making waffle, which is made from a batter containing egg, flour, sugar, milk, etc. Examples of various types of waffles are Belgian waffle and Liege waffle. A conventional waffle iron includes a lower grill unit and an upper grill unit that are hinged together and that cooperatively define a cooking space therebetween. The upper grill unit includes an upper grill plate that is gridded. The lower grill unit includes a lower grill plate that corresponds in shape to the upper grill plate. Each of the lower and upper grill plates has a grill surface. To make a waffle, first the upper grill unit is pivoted upward, and a batter is poured onto the grill surface of the lower grill plate. Afterwards, the upper grill unit is pivoted downward to cover the lower grill plate, and the upper and lower grill plates are heated by heating elements of the upper and lower grill units for heating the batter to form a waffle.

During waffle making, usually the batter is randomly poured onto the lower grill plate, and the batter cannot spread quickly and evenly on the grill surface of the lower grill plate by itself. Furthermore, the fluidity of the batter decreases upon contacting the heated lower grill plate during pouring of the batter. Therefore, it is relatively difficult to obtain a waffle having a uniform thickness and without uneven edges.

SUMMARY

An object of the disclosure is to provide a lower grill plate that can alleviate at least one of the drawback of the prior art.

According to the disclosure, the lower grill plate is adapted for use in a grill device and is adapted to be disposed at a position lower than a feed opening of the grill device. The lower grill plate includes a plate body and a flow-diverging stage. The plate body has a central portion that is adapted to be positioned under and aligned with the feed opening of the grill device, and a surrounding portion that surrounds the central portion. The flow-diverging stage protrudes upwardly from the central portion of the plate body, and has a flow-diverging convex surface that is adapted to face the feed opening of the grill device and that is for diverging flow of a fluid material which flows from the feed opening onto the plate body. The flow-diverging convex surface has atop end positioned higher than the plate body.

Another object of the disclosure is to provide a grill device that can alleviate at least one of the drawback of the prior art.

According to the disclosure, the grill device includes a lower grill unit and an upper grill unit. The lower grill unit includes a lower seat, the aforementioned lower grill plate, and a heating element disposed for heating the lower grill plate. The lower grill plate is coupled to atop end portion of the lower seat. The upper grill unit is openably connected to the lower grill unit, and has the feed opening which corresponds in position to the flow-diverging convex surface of the flow-diverging stage of the lower grill plate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
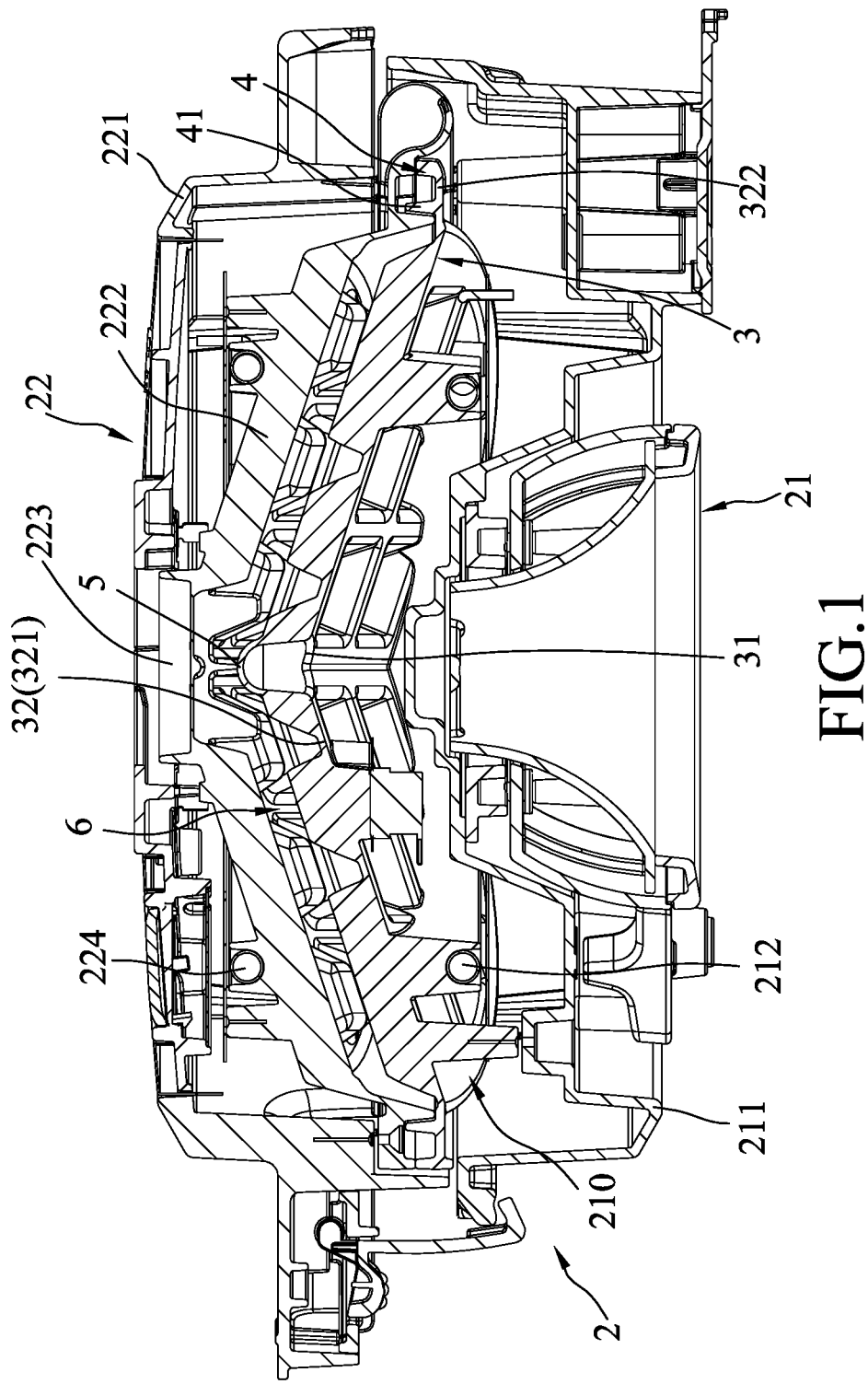
FIG. 1 is a sectional view illustrating a first embodiment of a grill device according to the disclosure.
Figure 2:
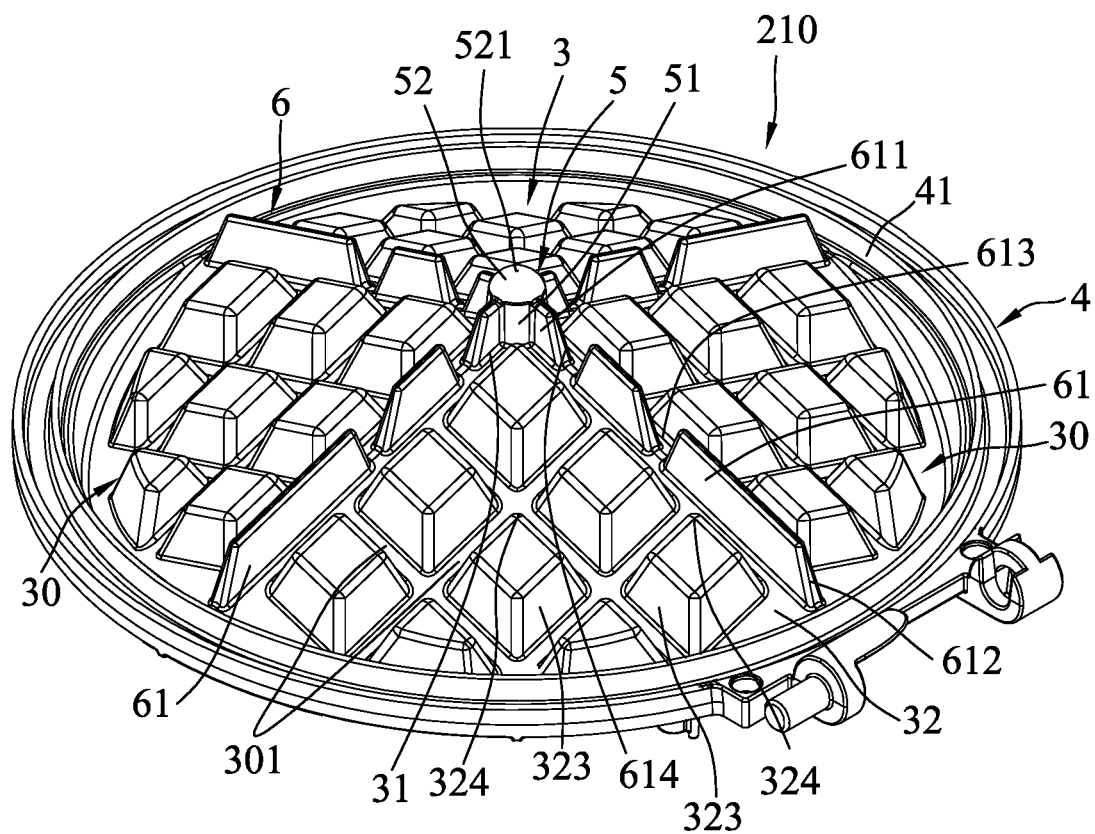
FIG. 2 is a perspective view illustrating a lower grill plate of the first embodiment.
Figure 3:
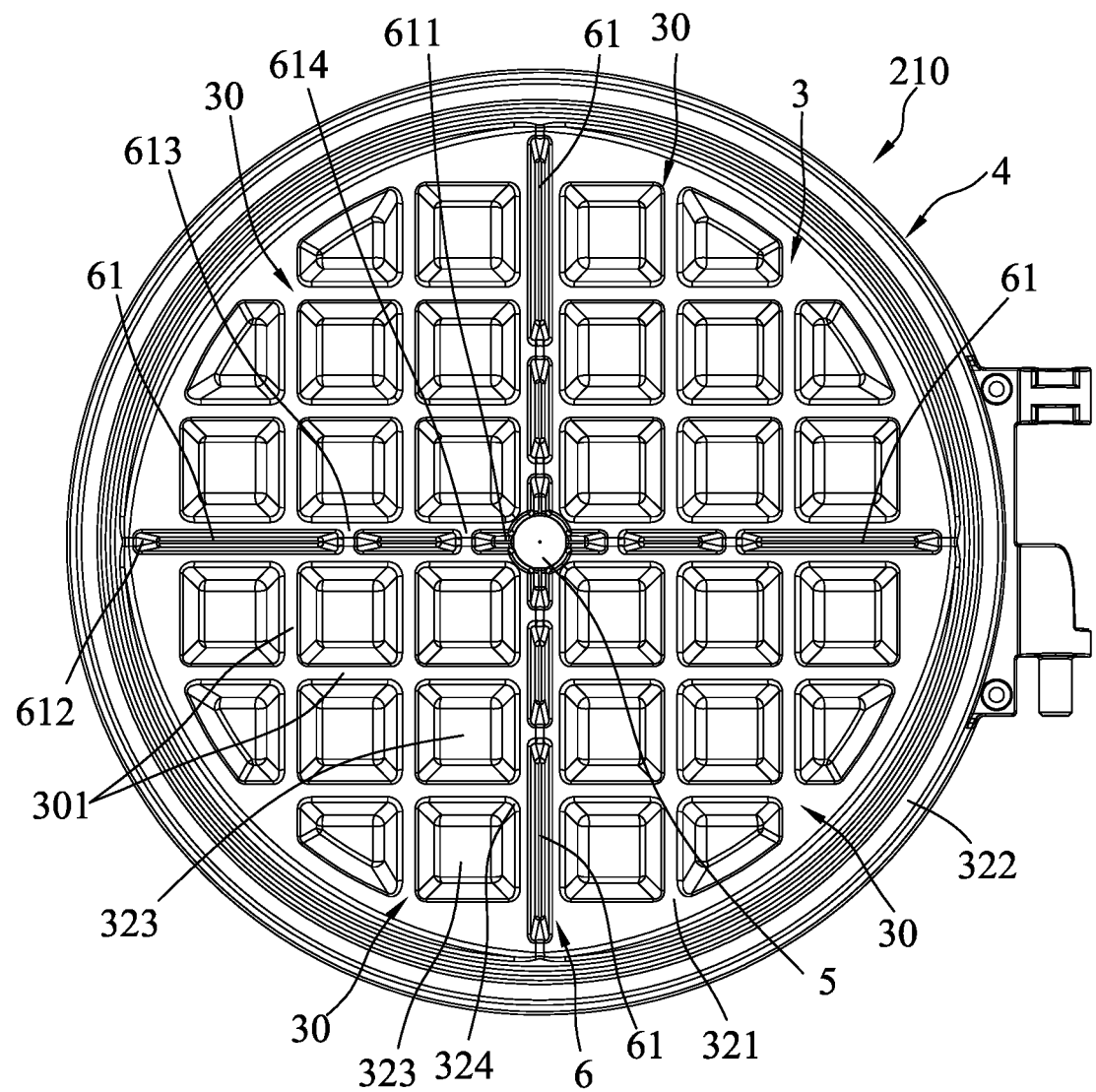
FIG. 3 is a top view illustrating the lower grill plate of the first embodiment.
Figure 4:
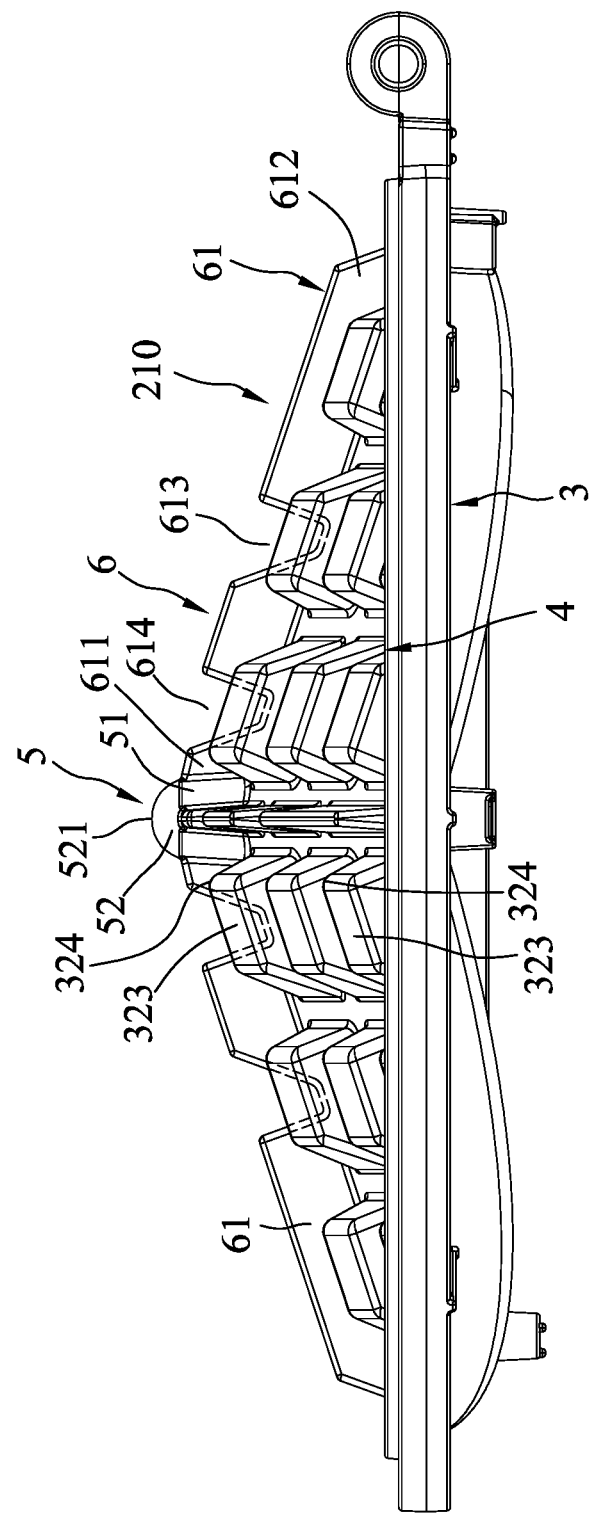
FIG. 4 is a side view illustrating the lower grill plate of the first embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, the first embodiment of a grill device according to the disclosure is configured as a waffle iron that can heat a fluid material (i.e., a batter) to form a waffle. The grill device includes a lower grill unit 21, and an upper grill unit 22 openably connected to the lower grill unit 21.

The lower grill unit 21 includes a lower seat 211, a lower grill plate 210 coupled to a top end portion of the lower seat 211, and a heating element 212 disposed for heating the lower grill plate 210.

The upper grill unit 22 has an upper seat 221, an upper grill plate 222 coupled to a bottom end portion of the upper seat 221, a feed opening 223 extending through the upper seat 221 and the upper grill plate 222, and a heating element 224 disposed for heating the upper grill plate 222. The feed opening 223 is disposed to correspond in position to a center part of the lower grill plate 210, and is for flowing of the fluid material therethrough and onto the lower grill plate 210.

The lower grill plate 210 is disposed at a position lower than the feed opening 223 of the upper grill unit 22. The lower grill plate 210 includes a circular plate body 3, a flow-diverging stage 5 integrally connected to the plate body 3 and disposed at a center of the plate body 3, a projecting wall unit 4 projecting upwardly from the plate body 3, and a dividing unit 6.

The plate body 3 has a central portion 31 that is positioned under and aligned with the feed opening 223, and a surrounding portion 32 that surrounds the central portion 31. The surrounding portion 32 of the plate body 3 has a base wall 321 that is inclined downwardly from the central portion 31 of the plate body 3 toward a periphery of the plate body 3, and an annular extension wall 322 that extends horizontally, that surrounds the base wall 321, and that forms the periphery of the plate body 3. The surrounding portion 32 further has a plurality of spaced-apart protruding members 323 that are disposed on and protrude upwardly from the base wall 321. In this embodiment, the protruding members 323 are cuboid in shape. Each of the protruding members 323 has an uppermost end 324 which is proximate to the flow-diverging stage 5.

The projecting wall unit 4 is integrally connected to the plate body 3, and includes an inner projecting wall 41 that projects upwardly from the annular extension wall 322.

In this embodiment, the flow-diverging stage 5 has a substantially cylindrical structure, and protrudes upwardly from the central portion 31 of the plate body 3. The flow-diverging stage 5 has a flow-diverging convex surface 52 that corresponds in position to and faces the feed opening 223 of the upper grill unit 22 and that is for diverging flow of the fluid material which flows from the feed opening 223 onto the plate body 3, and an upright surrounding surface 51 that is located under the flow-diverging convex surface 52. More specifically, the flow-diverging convex surface 52 is a hemispheric surface, is located directly under the feed opening 223, and has a top end 521 aligned with a center of the feed opening 223 and positioned higher than any part of the plate body 3. That is, the uppermost end 324 of each of the protruding members 323 is positioned lower than the top end 521 of the flow-diverging convex surface 52 of the flow-diverging stage 5.

In this embodiment, the dividing unit 6 is disposed on and integrally connected to the plate body 3. Specifically, in this embodiment, the plate body 3, the projecting wall unit 4, the flow-diverging stage 5 and the dividing unit 6 are integrally molded as one piece. The dividing unit 6 cooperates with the surrounding portion 32 of the plate body 3 to define a plurality of space zones 30 which are adapted to receive the fluid material thereon, and in which the protruding members 323 are located. Each of the space zones 30 has a plurality of flow channels 301 formed between adjacent ones of the protruding members 323 for flow of the fluid material therein. The dividing unit 6 has a plurality of dividers 61 that are connected to and diverge from the upright surrounding surface 51 of the flow-diverging stage 5, and that are equi-angularly spaced apart from each other. Each of the dividers 61 divides a corresponding adjacent pair of the space zones 30 from each other. The dividing unit 6 of this embodiment has a cross-shaped structure, but is not limited thereto.

In greater detail, each of the dividers 61 has a first end portion 611 that is connected to the upright surrounding surface 51 of the flow-diverging stage 5, and a second end portion 612 that is opposite to the first end portion 611, that is adjacent to the inner projecting wall 41 of the projecting wall unit 4 but not connected to the inner projecting wall 41. Each of the dividers 61 further has a first notch 613 and a second notch 614 that are located between the first and second end portions 611, 612. Each of the first and second notches 613, 614 of each of the dividers 61 fluidly communicates the corresponding adjacent pair of the space zones 30 for evenly distributing the fluid material in the space zones 30.

It should be noted that the number of the notches of each of the dividers 61 is not limited. In other modification of this embodiment, the second notch 614 may be omitted. That is, each of the dividers 61 has only one first notch 613 that fluidly communicates the corresponding adjacent pair of the space zones 30. In this embodiment, for each divider 61, the first notch 613 is located at a midpoint between the first and second end portions 611, 612, and the second notch 614 is located at a midpoint between the first end portion 611 and the first notch 613.

To make a waffle, first the fluid material is poured into the feed opening 223 of the upper grill unit 22. Since the flow-diverging convex surface 52 of the flow-diverging stage 5 is located directly under the feed opening 223 and is hemispheric, the fluid material will flow downwardly from the flow-diverging convex surface 52 and spread outwardly toward the surrounding portion 32 of the plate body 3 of the lower grill plate 210 in an evenly distributing manner. Moreover, since the base wall 321 of the surrounding portion 32 of the plate body 3 is inclined downwardly toward the periphery of the plate body 3, the fluid material will spread further outward until reaching the projecting wall unit 4 with the aid of gravity. As the amount of the fluid material accumulated near the projecting wall unit 4 increases and the fluid material reaches a height level which is the same as that of the first notches 613 with respect to a horizontal plane (not shown), the fluid material may flow through the first notches 613 if the amount of the fluid material in each of the space zones 30 is different, so as to facilitate even distribution of the fluid material in the space zones 30. Afterwards, as the fluid material reaches a height level which is the same as that of the second notches 614 with respect to the horizontal plane, the same distribution effect is achieved.

In summary, the design of the flow-diverging convex surface 52 of the flow-diverging stage 5 enables the fluid material to flow and spread out more evenly on the plate body 3 of the lower grill plate 210. The first and second notches 613, 614 facilitate even distribution of the fluid material in the space zones 30. Therefore, comparing with the conventional grill device, the fluid material can be spread out more evenly and more rapidly on the lower grill plate 210 of this disclosure, thereby preventing the waffle formed from having uneven edges and ensuring the waffle to have a uniform thickness.

Figure 5:
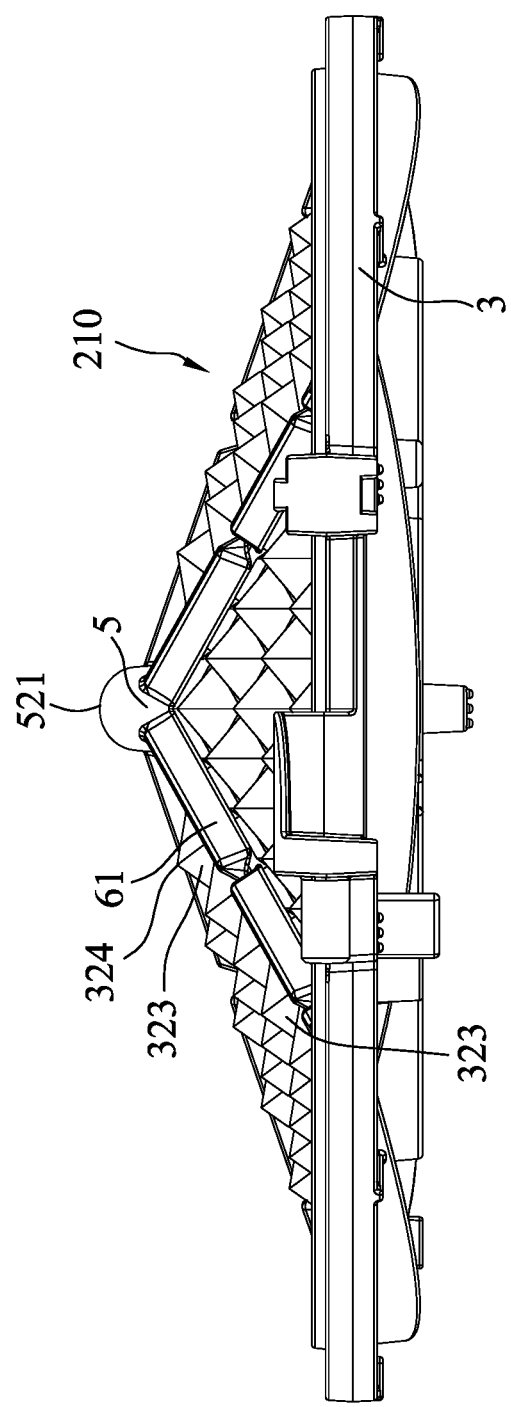
FIG. 5 is a side view illustrating a lower grill plate of a second embodiment of the grill device according to the disclosure.
Figure 6:
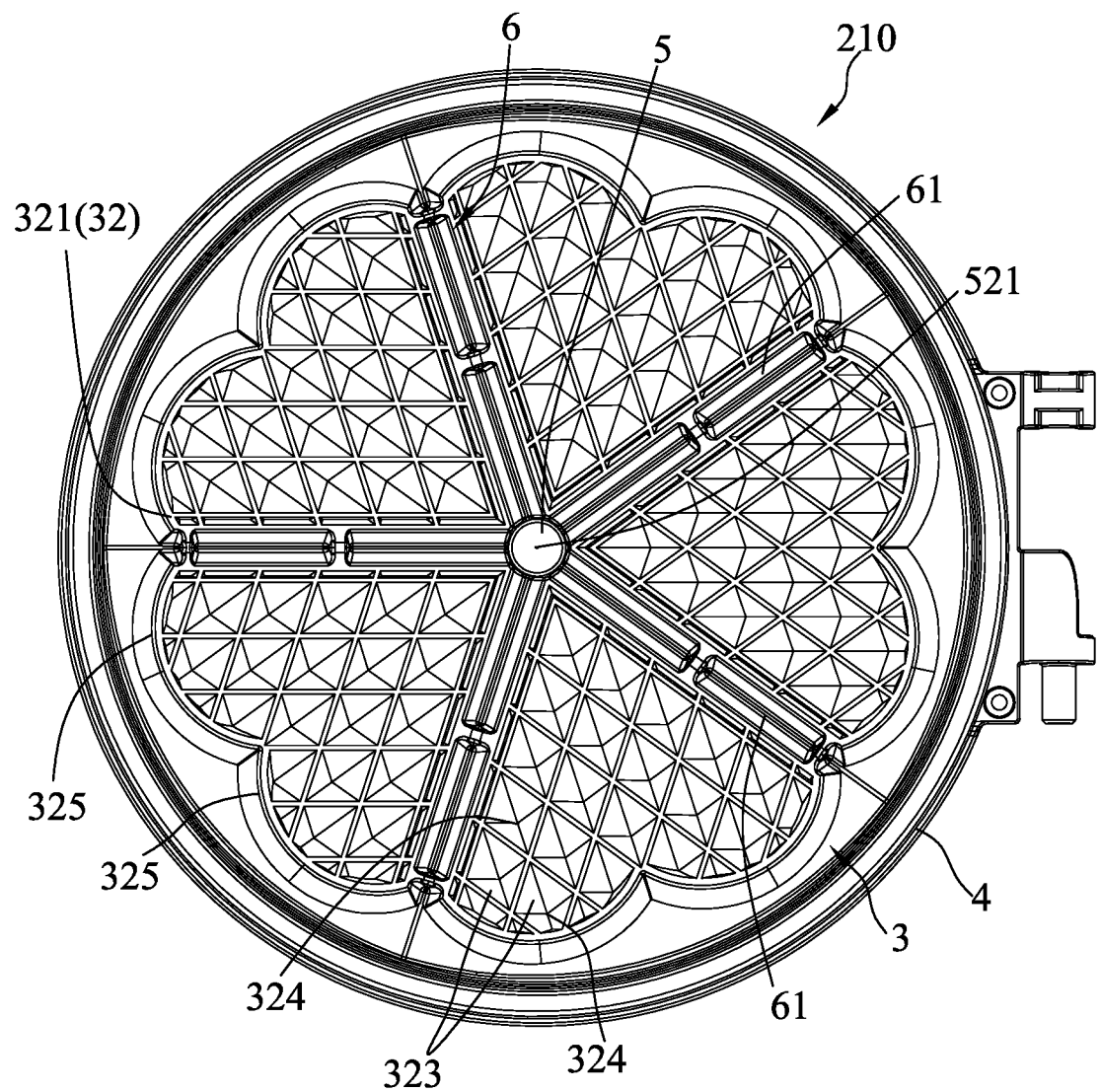
FIG. 6 is a top view illustrating the lower grill plate of the second embodiment.

Referring to FIGS. 5 and 6, a second embodiment of the grill device according to the disclosure is similar to the first embodiment, the difference between the first and second embodiments resides in that the protruding members 323 of the second embodiment are pyramidal in shape. In the second embodiment, the number of the dividers 61 of the dividing unit 6 is five, and the surrounding portion 32 of the plate body 3 of the lower grill plate 210 is provided with a plurality of curved ridges 325 protruding upwardly from the base wall 321 and surrounding the protruding members 323. The ridges 325 are arranged in pairs, and each pair of the ridges 325 is disposed between two adjacent ones of the dividers 61 such that a flower pattern is formed on the lower grill plate 210.

Figure 7:
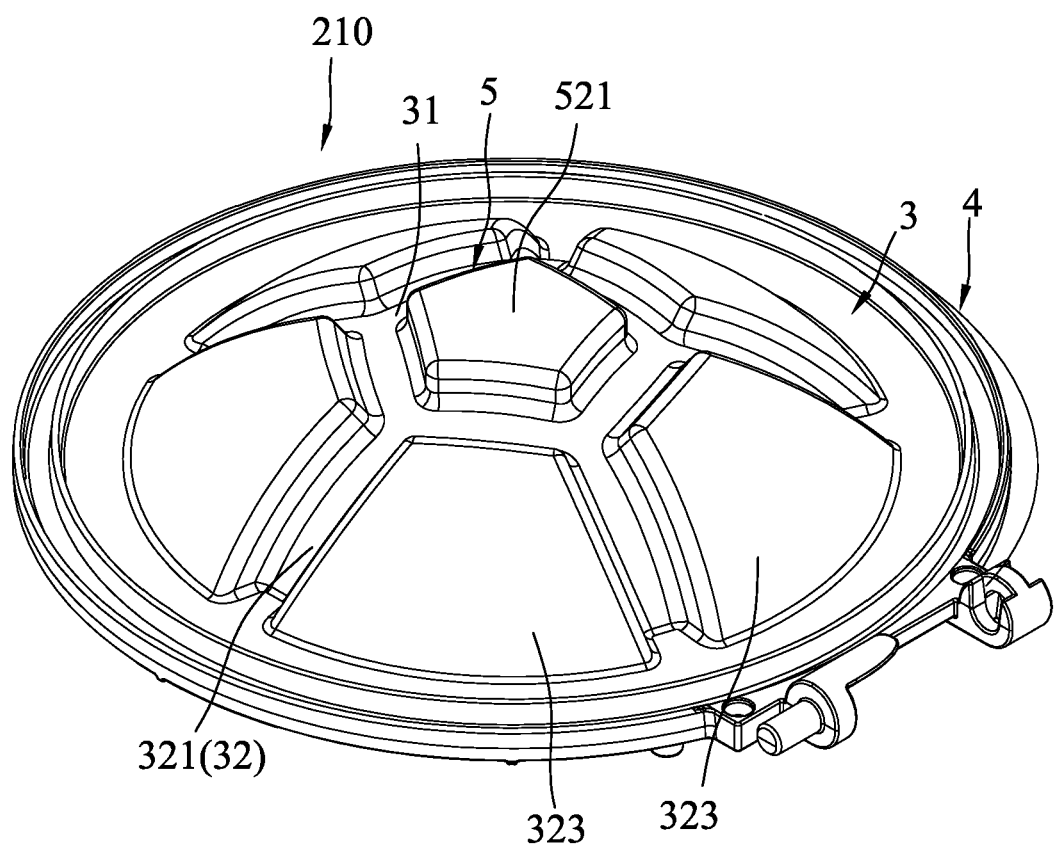
FIG. 7 is a perspective view illustrating a lower grill plate of a third embodiment of the grill device according to the disclosure.
Figure 8:
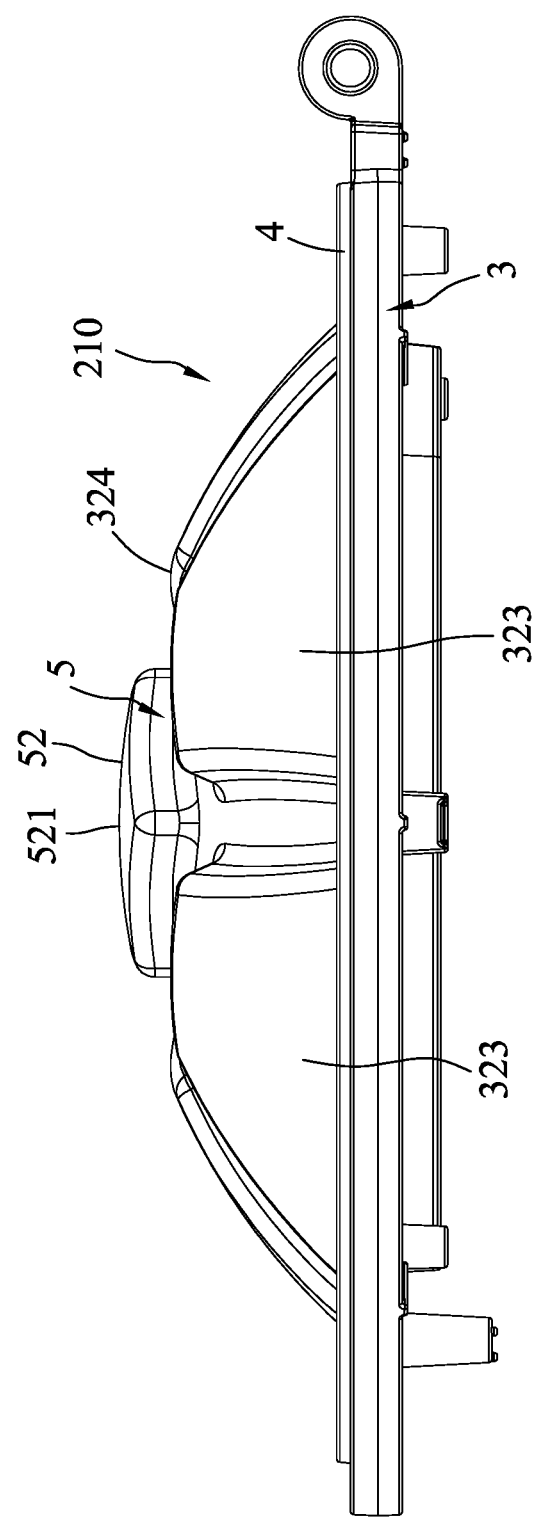
FIG. 8 is a side view illustrating the lower grill plate of the third embodiment.

Referring to FIGS. 7 and 8, a third embodiment of the grill device according to the disclosure is similar to the first embodiment, the difference between the first and third embodiments resides in that in the third embodiment, the dividing unit 6 (see FIG. 2) is omitted, the base wall 321 of the surrounding portion 32 of the plate body 3 cooperates with the central portion 31 to form a dome shape, and each of the protruding members 323 and the flow-diverging stage 5 is formed as a prism. The flow-diverging convex surface 52 of the third embodiment is convex toward the feed opening 223, and has the top end 521 that is positioned higher than the uppermost end 324 of each of the protruding members 323.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lower grill plate for being disposed at a position lower than a feed opening of a grill device, said lower grill plate comprising:
    a plate body having a central portion that is for being positioned under and aligned with the feed opening of the grill device, and a surrounding portion that surrounds said central portion; and
    a flow-diverging stage protruding upwardly from said central portion of said plate body, and having a flow-diverging convex surface for facing the feed opening of the grill device and that is for diverging flow of a fluid material which flows from the feed opening onto said plate body, said flow-diverging convex surface having a top end positioned higher than said plate body.

2. The lower grill plate as claimed in claim 1, further comprising a dividing unit disposed on said plate body and cooperating with said surrounding portion of said plate body to define a plurality of space zones for receiving the fluid material thereon.

3. The lower grill plate as claimed in claim 2, wherein:
    said flow-diverging convex surface of said flow-diverging stage is a hemispheric surface;
    said flow-diverging stage further has an upright surrounding surface that is located under said flow-diverging convex surface; and
    said dividing unit has a plurality of dividers that are connected to and diverge from said upright surrounding surface of said flow-diverging stage, and that are equiangularly spaced apart from each other, each of said dividers dividing a corresponding adjacent pair of said space zones from each other.

4. The lower grill plate as claimed in claim 3, wherein each of said dividers has a first notch that fluidly communicates the corresponding adjacent pair of said space zones.

5. The lower grill plate as claimed in claim 4, wherein each of said dividers further has a first end portion that is connected to said flow-diverging stage, and a second end portion that is opposite to said first end portion, said first notch of each of said dividers being located at a midpoint between said first and second end portions.

6. The lower grill plate as claimed in claim 5, wherein each of said dividers further has a second notch that is located at a midpoint between said first end portion and said first notch, and that fluidly communicates the corresponding adjacent pair of said space zones.

7. The lower grill plate as claimed in claim 2, wherein said surrounding portion of said plate body has a base wall that is inclined downwardly from said central portion of said plate body toward a periphery of said plate body, and a plurality of spaced-apart protruding members that are disposed on said base wall and that are located in said space zones, each of said protruding members having an uppermost end positioned lower than said top end of said flow-diverging convex surface of said flow-diverging stage.

8. The lower grill plate as claimed in claim 7, wherein said protruding members are cuboid in shape.

9. The lower grill plate as claimed in claim 7, wherein said protruding members are pyramidal in shape.

10. The lower grill plate as claimed in claim 7, wherein:
    said surrounding portion of said plate body further has an annular extension wall that surrounds said base wall and that forms the periphery of said plate body; and
    said lower grill plate further comprises a projecting wall unit projecting upwardly from said annular extension wall.

11. The lower grill plate as claimed in claim 1, wherein said surrounding portion of said plate body has a base wall that surrounds said central portion and that cooperates with said central portion to form a dome shape, and a plurality of spaced-apart protruding members that protrude upwardly from said base wall, each of said protruding members having an uppermost end positioned lower than said top end of said flow-diverging convex surface of said flow-diverging stage.

12. The lower grill plate as claimed in claim 11, wherein each of said protruding members and said flow-diverging stage is formed as a prism.

13. The lower grill plate as claimed in claim 12, wherein:
    said surrounding portion of said plate body further has an annular extension wall that forms a periphery of said plate body; and
    said lower grill plate further comprises a projecting wall unit projecting upwardly from said annular extension wall.

14. A grill device comprising:
    a lower grill unit including a lower seat, a lower grill plate disposed at a position lower than a feed opening of said grill device, and a heating element disposed for heating said lower grill plate, said lower grill plate being coupled to a top end portion of said lower seat and including
        a plate body that has a central portion positioned under and aligned with said feed opening of said grill device, and a surrounding portion surrounding said central portion, and a flow-diverging stage that protrudes upwardly from said central portion of said plate body, and that has a flow-diverging convex surface facing said feed opening of said grill device and for diverging flow of a fluid material which flows from the feed opening onto said plate body, said flow-diverging convex surface having a top end positioned higher than said plate body; and an upper grill unit openably connected to said lower grill unit, and having said feed opening which corresponds in position to said flow-diverging convex surface of said flow-diverging stage of said lower grill plate.

* * * * *